Aug. 28, 1928.
W. A. OWEN
1,682,707
REPAIR PART FOR FOOTWEAR
Filed Jan. 6, 1922
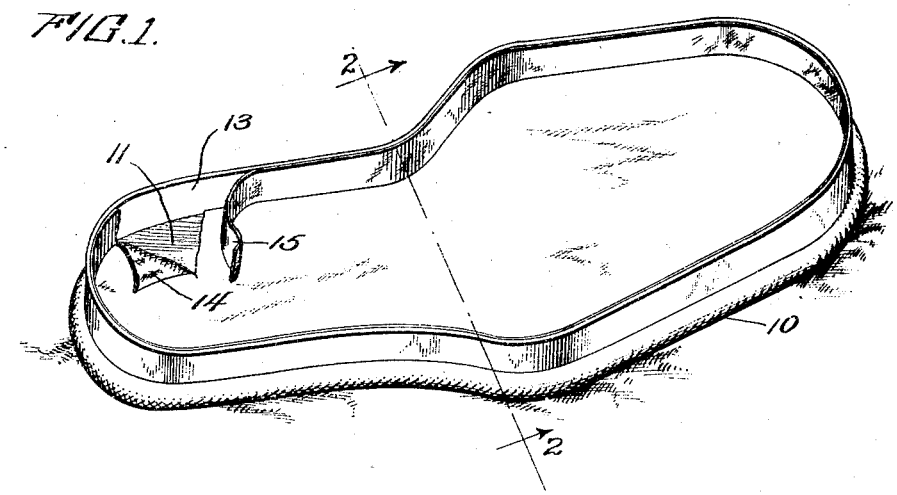
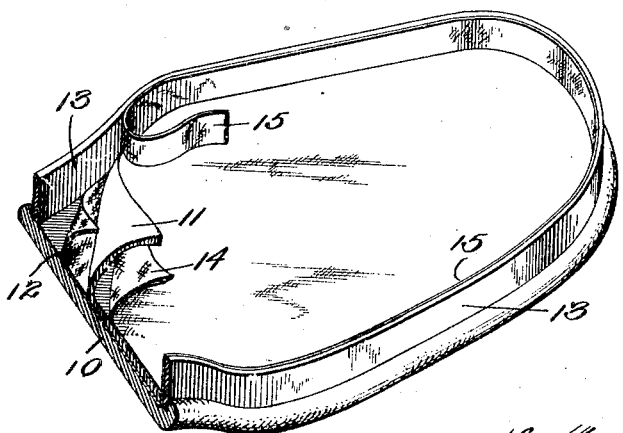
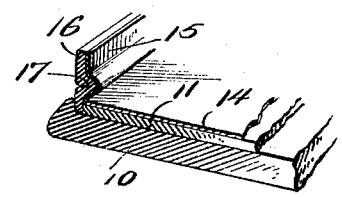
Inventor.
William A. Owen
By R. S. Wagner
his Attorney Patented Aug. 28, 1928.

1,682,707

UNITED STATES PATENT OFFICE.

WILLIAM A. OWEN, OF AKRON, OHIO.

REPAIR PART FOR FOOTWEAR.

Application filed January 6, 1922. Serial No. 527,337.

My invention relates to footwear and it particularly embraces a novel article for use in the manufacture and repair of boots and shoes.

Repair parts for boots and shoes have heretofore been formed of completely vulcanized rubber composition, and semi-vulcanized parts have been proposed for use in the manufacture of footwear.

In the repair of footwear it is difficult to effect a satisfactory union between the repair parts and the boot or shoe if the repair part is completely vulcanized. It is well known to those engaged in the manufacture of rubber articles, that an effective union between two completely vulcanized surfaces is difficult to obtain without the use of elaborate and expensive equipment for applying the necessary degree of heat and pressure to the surfaces being joined. It is also well known that, if one of the surfaces is of semi or unvulcanized rubber composition, it is a comparatively simple operation to obtain a lasting and effective union between the parts.

My invention contemplates the manufacture of a repair part for boots and shoes that embodies a completely vulcanized wearing portion and an attaching surface of plastic and adhesive rubber composition that is vulcanized to only a limited degree. My invention furthermore contemplates means for protecting the attaching surface by a removable coating of material that remains on the repair part until the repair part is attached to the shoe.

The accompanying drawing illustrates the application of my invention to the manufacture of a sole and heel for the repair of boots or shoes.

Fig. 1 of the drawing is a perspective view of a full sole of rubber or molded composition that is constructed in accordance with my invention;

Fig. 2 is a view, partially in section and partially in perspective, taken substantially on the line 2—2 of Fig. 1, illustrating the composite parts of my improved sole for repairing footwear;

Fig. 3 is a fragmentary sectional view of a modified form of my invention.

The repair sole shown in Figs. 1 and 2 of the drawing, embodies a fully vulcanized wearing portion 10, a semi or unvulcanized layer of rubber composition 11, and an interposed layer of cloth 12. The edges of the wearing portion 10 of the sole terminate in a narrow strip 13 of semi or unvulcanized rubber. The entire inner surface of the repair part thus formed is protected by a covering of Holland cloth 14 and 15, that prevents the oxidation of the tacky and plastic surface of the uncured rubber gum from which the layer 11 and the inner surface of the strip 13 are formed.

The manufacture of a repair part of this nature embraces certain novel steps that have heretofore not been practiced. The composition of the layer of rubber 11 and of the inner surface of the strip 13 is of such nature that it will not become vulcanized to any appreciable extent in the same time that the wearing portion 10 of the sole becomes fully cured. The union between the layer of rubber 11 and the wearing portion of the sole is effected by the vulcanization of the two parts and the migratory action of the vulcanizing agent, such as sulfur, in passing from the adjacent layer of frictioned cloth 12 or rubber composition 10 into the adjacent surface of the uncured layer of rubber gum 11. It has been found that a sufficient quantity of vulcanizing agent is thus transmitted to permanently and securely unite these surfaces. Prior to the vulcanization of this repair part the attaching surfaces are completely protected by means of the layers of the Holland cloth 14 and 15. This prevents the action of either the air or steam on these surfaces, effectively preserves the adhesive and plastic qualities of such surfaces, and facilitates the handling of the finished repair parts.

A convenient method of assembling a repair part of this nature is to calender layers 11, 12 and 14 together to thus provide a sheet of material embodying a layer 12 of fabric that is frictioned on both sides, a layer 11 of rubber composition of the nature described, and a protective layer of Holland cloth 14. Suitable shapes are cut from this sheet of assembled material to provide the corresponding elements of the sole shown in the drawing. The wearing portion 10 is formed from a sheet of the rubber composition that is separately cut. While this material is in its unvulcanized state, the various parts are assembled, as shown in the drawing, and the assembled unit is subjected to heat with or without pressure. As previously described, the effect of this heat is to completely vulcanize the wearing portion 10 of the sole and to effectively unite, through the migratory action of the vulcanizing agent, the layers 10, 11, 12 and 13 of the repair sole.

If it is desired to apply this repair sole to a boot or shoe, the layer of Holland cloth is stripped from the attaching surface of the adhesive and plastic layer of rubber 11, and from the inner surface of the edge strip 13. The sole is then mounted on the boot or shoe, which has previously been cleaned with benzol or other suitable agents, in such manner as to insure an intimate union between the attached parts.

The sulfur content of the boot or shoe is sufficient to establish a vulcanized condition in the attaching surface of the repair part, and, even the minute particles of air that reach such surfaces, effectively unite the repair part to the shoe. The vulcanization of the attaching surface is effected in this instance, as in the former instance, by the migratory action of the sulfur contained in the previously vulcanized portion of the shoe to which the repair part is attached and by oxidation.

Fig. 3 shows a modified form of my invention in which the intermediate layer of fabric 12 is omitted from between the wearing portion 10 and the plastic portion 11 of the repair part. The major function in the layer of fabric 12 is to maintain the shape of the sole altho it may be employed as a vehicle for a vulcanizing compound that effectively unites the component part of the sole.

Each edge strip 16 of the sole shown in Fig. 3 embodies a longitudinal fold 17 that serves to more closely unite the strip of material with the upper of the shoe, and to completely fill all spaces between the shoe and the repair part. The attaching surfaces of the sole shown in Fig. 3, are also protected by a coating of material, such as Holland cloth, that is removed only upon application of the part.

Although I have described a limited number of modifications of my invention, I desire that only such limitations shall be imposed as are set forth in the accompanying claims.

What I claim is:

1. A molded article of manufacture comprising a layer of completely vulcanized rubber composition, a layer of relatively unvulcanized rubber composition having an attaching surface, an intermediate layer of fabric vulcanized to said layers of rubber composition, and a removable protective covering adhesively secured to the attaching surface of said unvulcanized layer of rubber composition.

2. A repair sole for footwear comprising a layer of completely vulcanized wear-resisting material, a layer of substantially unvulcanized plastic and adhesive rubber composition, an intermediate layer of fabric, edge portions of unvulcanized material, and a protective coating for the inner surfaces of said layer of unvulcanized material and of said edge portions, said protective coverings being removable upon the application of the repair sole.

3. The process of manufacturing shoe soles which comprises disposing a layer of fabric between two layers of rubber compound of relatively different vulcanizing characteristics, and completely vulcanizing only one of said layers.

4. The process of manufacturing shoe soles which comprises disposing a layer of fabric between two layers of rubber compound of relatively different vulcanizing characteristics, completely vulcanizing only one of said layers, and partially vulcanizing the second layer.

5. The process of manufacturing shoe soles which comprises assembling a layer of frictioned fabric between and in engagement with two layers of rubber compound of different curing characteristics, and applying heat to cure one of said compounds and effect a union between the various layers by the migratory action of a vulcanizing agent through the frictioned fabric.

In witness whereof I have hereunto signed my name.

WILLIAM A. OWEN.